US012675028B2

(12) United States Patent
Osaka et al.

(10) Patent No.: US 12,675,028 B2
(45) Date of Patent: Jul. 7, 2026

(54) LENS APPARATUS AND IMAGE PICKUP APPARATUS

(71) Applicant: CANON KABUSHIKI KAISHA, Tokyo (JP)

(72) Inventors: Hiroki Osaka, Tochigi (JP); Yuichiro Kato, Tochigi (JP); Masayasu Mizushima, Tochigi (JP); Toshimune Nagano, Saitama (JP); Akino Moriyoshi, Tochigi (JP); Toru Matsumoto, Tochigi (JP); Yoshiki Saji, Kanagawa (JP); Takami Hirasawa, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 169 days.

(21) Appl. No.: 18/626,426

(22) Filed: Apr. 4, 2024

(65) Prior Publication Data

US 2024/0337905 A1      Oct. 10, 2024

(30) Foreign Application Priority Data

Apr. 7, 2023    (JP) .............................. JP2023-062509

(51) Int. Cl.
G03B 13/36 (2021.01)
G03B 13/30 (2021.01)
H04N 23/67 (2023.01)

(52) U.S. Cl.
CPC ............. *G03B 13/36* (2013.01); *G03B 13/30* (2013.01); *H04N 23/67* (2023.01)

(58) Field of Classification Search
CPC ... G03B 5/08; G03B 13/36; H04N 23/67–676
See application file for complete search history.

(56) References Cited

U.S. PATENT DOCUMENTS 6,449,004 B1 * 9/2002 Okisu .................... H04N 23/81
                                                          348/42
7,634,184 B2 * 12/2009 Woehler ................... G03B 5/08
                                                          396/89

(Continued)

FOREIGN PATENT DOCUMENTS

JP      2017098613 A     6/2017
JP      2019090952 A     6/2019

(Continued)

*Primary Examiner* — Leon W Rhodes, Jr.
(74) *Attorney, Agent, or Firm* — ROSSI, KIMMS & McDOWELL LLP

(57) ABSTRACT

Provided is a lens apparatus including: an optical system including: an optical system including a plurality of lenses; a tilting unit configured to change an angle of an object plane to an optical axis about with respect to an axis of rotation as a center by displacing at least a part some of the plurality of lenses; an aperture stop having configured to change an aperture amount which is changeable; an aperture stop driving unit configured to drive the aperture stop to change the aperture amount by driving the aperture stop; an in-focus information obtaining unit configured to obtain a first in-focus information of a first object which is displaced from the axis of rotation; and a control unit configured to control the aperture stop driving unit based on the first in-focus information and a drive information of the tilting unit.

14 Claims, 7 Drawing Sheets

(56)            References Cited

U.S. PATENT DOCUMENTS

| 8,687,080 | B2 * | 4/2014 | Kawarada ............ H04N 23/672 |
| | | | 348/222.1 |
| 10,917,580 | B2 | 2/2021 | Niga et al. |
| 11,310,431 | B2 | 4/2022 | Sugaya |
| 2017/0272658 | A1 * | 9/2017 | Ito .......................... H04N 23/55 |
| 2021/0067704 | A1 * | 3/2021 | Chino ................. H04N 23/687 |

FOREIGN PATENT DOCUMENTS

| JP | 2020101626 A | 7/2020 |
| JP | 2020106630 A | 7/2020 |
| JP | 2020155958 A | 9/2020 |
| JP | 2022048079 A | 3/2022 |

* cited by examiner

LENS APPARATUS AND IMAGE PICKUP APPARATUS

BACKGROUND OF THE INVENTION

Field of the Invention

The present invention relates to a lens apparatus and an image pickup apparatus.

Description of the Related Art

Image pickup apparatus such as single-lens reflex cameras on the recent market have been demanded to enable tilt imaging having an in-focus range adjusted by tilting the lens, or shift imaging having an imaging angle of view changed, or distortion corrected by horizontally or vertically shifting the lens. Thus, the lens apparatus which has a tilt mechanism for rotating some or all of image pickup lenses with respect to a camera body about a single point on an optical axis, or a shift mechanism for parallel movement of the lens orthogonally to the optical axis has been proposed.

The tilt imaging allows an object plane to be tilted with respect to a plane orthogonal to an optical axis of an image pickup optical system so that the object can be brought into a fully or partially in-focus condition favorably.

In Japanese Patent Application Laid-Open No. 2019-090952, there is disclosed a zoom lens that allows the tilt imaging and the shift imaging by moving two lens units in a direction orthogonal to the optical axis.

In Japanese Patent Application Laid-Open No. 2017-098613, there is disclosed a control method for determining as to which image pickup mode of the tilt image pickup mode or the non-tilt image pickup mode attains an image pickup with a smaller f-number for bringing a plurality of objects into in-focus conditions.

However, the angle at which the image pickup apparatus can tilt the object plane for imaging is limited. In order to obtain a desired in-focus range, an f-number is required to be adjusted besides the tilt angle of the object plane. In Japanese Patent Application Laid-Open No. 2017-098613, the control is executed by preferentially setting the small f-number. As a result, the intention of a photographer cannot be reflected in setting of the f-number, and a range of imaging expression is thus narrowed.

SUMMARY OF THE INVENTION

It is an object of the present invention to provide a lens apparatus which allows easy adjustment of an in-focus range during tilt imaging.

In order to solve the above-mentioned problem, according to the present invention, there is provided a lens apparatus including: an optical system including a plurality of lenses; a tilting unit configured to change an angle of an object plane to an optical axis about with respect to an axis of rotation as a center by displacing at least a part some of the plurality of lenses; an aperture stop having configured to change an aperture amount which is changeable; an aperture stop driving unit configured to drive the aperture stop to change the aperture amount by driving the aperture stop; an in-focus information obtaining unit configured to obtain a first in-focus information of a first object which is displaced from the axis of rotation; and a control unit configured to control the aperture stop driving unit based on the first in-focus information and a drive information of the tilting unit.

According to the present invention, the lens apparatus which allows easy adjustment of the in-focus range during the tilt imaging can be provided.

Further features of the present invention will become apparent from the following description of exemplary embodiments with reference to the attached drawings.

DESCRIPTION OF THE EMBODIMENTS

Now, exemplary embodiments of the present invention are described in detail with reference to the attached drawings. In each figure, like components are denoted by like reference symbols, and their duplicate descriptions are omitted.

First Embodiment

Figure 1:
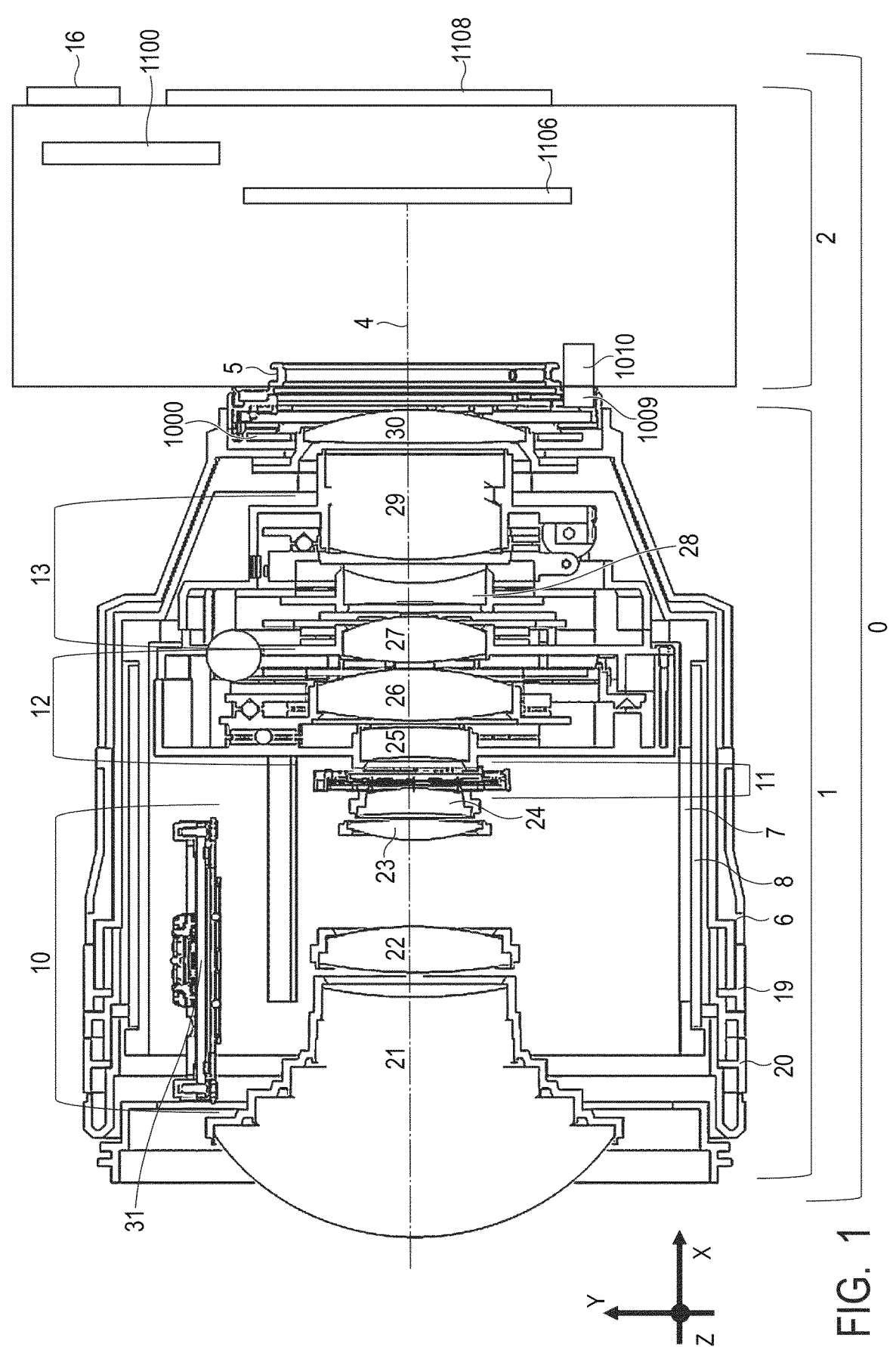
FIG. 1 is a sectional view of an image pickup apparatus according to each embodiment.
Figure 2:
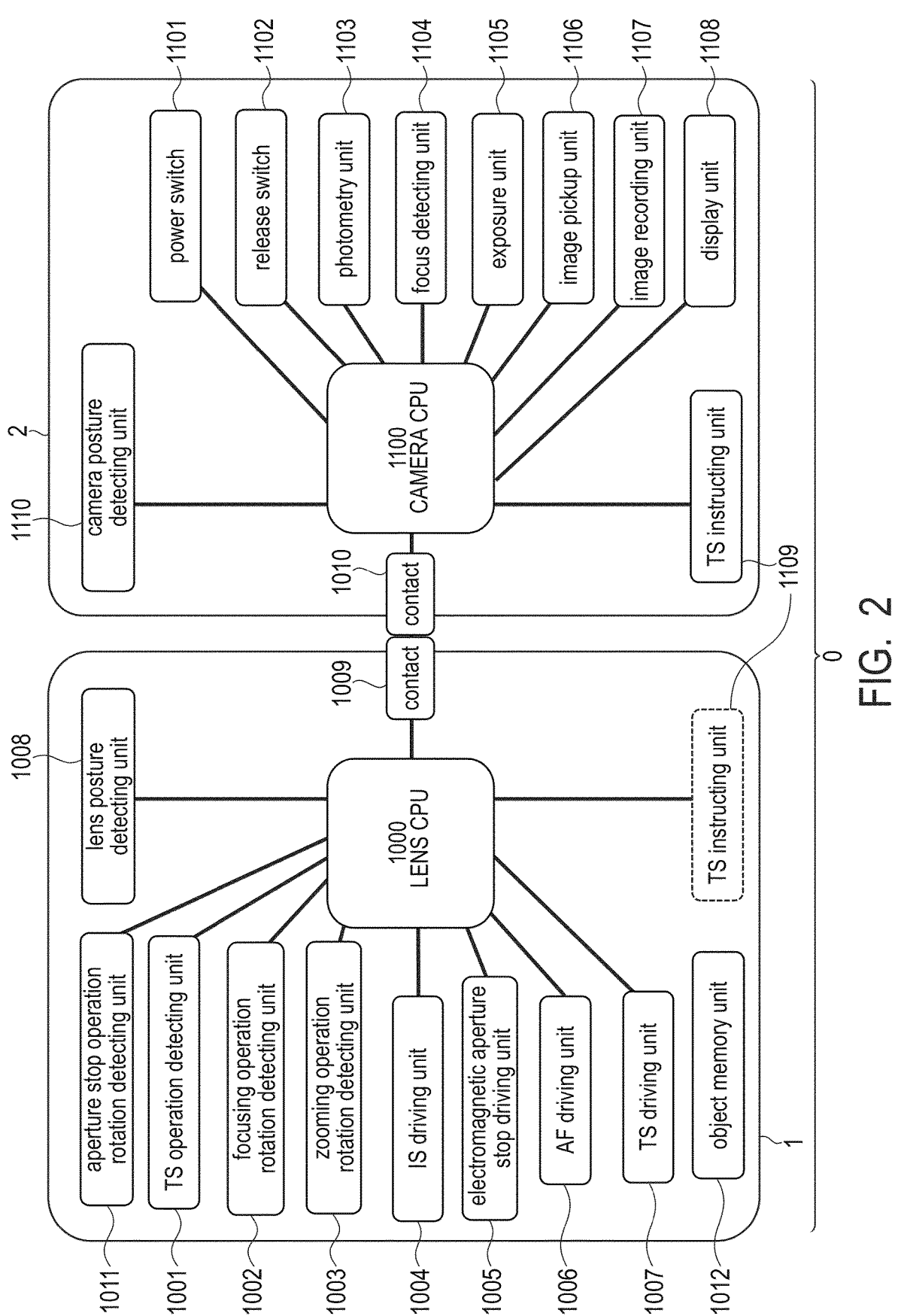
FIG. 2 is a block diagram of the image pickup apparatus according to each embodiment.

Referring to FIGS. 1, 2, 3A, and 3B, an image pickup apparatus according to a first embodiment of the present invention is described. FIG. 1 is a sectional view of a lens apparatus 1 and a camera body 2, which form an image pickup apparatus 0. In this case, an optical axis direction, a pitch direction, and a yaw direction of the lens apparatus 1 are defined as an X-axis direction, a Y-axis direction, and a Z-axis direction, respectively. FIG. 2 is a block diagram of the image pickup apparatus 0 formed by the lens apparatus 1 and the camera body 2.

The camera body 2 includes an image pickup unit 1106. A camera CPU (camera control unit) 1100 controls a shutter (not shown) to expose the image pickup unit 1106 for a suitable time period so that an image formed through the lens apparatus 1 is picked up. The camera body 2 includes a display unit 1108 for displaying a picked up image, and implementing a touch panel function which enables change in various setting of the image pickup apparatus 0, and a viewfinder 16 which enables a photographer to look in for confirmation of the photographed image, and to perform a visual line input.

The lens apparatus 1 includes a first lens unit 21, a second lens unit 22, a third lens unit 23, a fourth lens unit 24, a fifth lens unit 25, a sixth lens unit 26, a seventh lens unit 27, an eighth lens unit 28, a ninth lens unit, 29, and a tenth lens unit 30. An optical axis of the optical system consisting of those lenses is defined as an optical axis 4. A focal length of the lens apparatus 1 is varied by changing positional relations among those lenses in the optical axis direction. The lens apparatus 1 also includes an aperture stop mechanism (aperture stop) 11 that allows a lens CPU 1000 to change an aperture diameter (aperture amount) of the optical system.

The respective lens units are held by a lens barrel having a cam follower. Change in the positional relation of the lens units in the optical axis direction varies the focal length of the lens apparatus 1. The cam follower is engaged with a rectilinear groove formed in a guide barrel 7, which is parallel to the optical axis 4, and a groove formed in a cam barrel 8, which is tilted with respect to the optical axis 4. As a zooming operation ring 6 rotates, the cam barrel 8 having the groove tilted with respect to the optical axis 4 rotates. That is, the focal length can be varied by rotating the zooming operation ring 6. The focal length of the optical system can be detected by a zoom position detecting unit (not shown) for detecting a rotation amount of the zooming operation ring 6.

The second lens unit 22 is formed as a focus lens unit that moves along the optical axis 4 to allow a focus adjustment operation. A focus unit 10 is formed by the second lens unit 22, a guide bar (not shown) for guiding the second lens unit 22 along the optical axis 4, a vibration actuator 31 (driving mechanism), and a position detecting unit (not shown) for detecting a position of the second lens unit 22. A driving operation of the focus unit 10 is controlled by the lens CPU (focus control unit) 1000.

The lens apparatus 1 is configured to move each of the sixth lens unit 26 and the eighth lens unit 28 (tilting unit) in the direction orthogonal to the optical axis 4 to obtain a tilt effect for tilting the object plane with respect to an image plane, and a shift effect for moving an image pickup range to the direction vertical to the optical axis. Specifically, when both of the sixth lens unit 26 and the eighth lens unit 28 have positive refractive powers or have negative refractive powers, movement of the respective lens units in the opposite directions vertically to the optical axis 4 may provide the tilt effect. Meanwhile, under the same condition, movement of the respective lens units in the same direction may provide the shift effect. When the refractive power of the sixth lens unit 26 and the refractive power of the eighth lens unit 28 are opposite to each other in terms of positive and negative refractive powers, movement of those lenses in the opposite directions may provide the shift effect. Meanwhile, movement of those lenses in the same direction may provide the tilt effect. The sixth lens unit 26 forms a first shift unit 12 including a holding unit for movably holding the sixth lens unit 26 in the direction vertical to the optical axis 4, a driving unit for moving the holding unit, and a shift position detecting unit for detecting a position of the holding unit. The eighth lens unit 28 forms a second shift unit 13 in the same manner of the sixth lens unit 26. The first shift unit 12 and the second shift unit 13 are driven under the control of the lens CPU 1000.

The lens apparatus 1 includes a mount 5 to be fixedly connected to a mount (not shown) of the camera body 2. The lens apparatus 1 and the camera body 2 include a lens-side electric contact 1009 and a camera-side electric contact 1010, respectively, for connecting the lens CPU 1000 and the camera CPU 1100. Thus, it is possible to reflect contents set by the camera body 2 in the lens apparatus 1.

Next, a control flow to be executed in the camera body 2 during picking up image is described. The camera CPU 1100 is formed by a microcomputer. The camera CPU 1100 controls operations of the respective components of the camera body 2. At the time of mounting of the lens apparatus 1, the camera CPU 1100 communicates to and from the lens CPU 1000 installed in the lens apparatus 1 via the lens-side electric contact 1009 and the camera-side electric contact 1010.

The information (signal) to be transmitted to the lens CPU 1000 by the camera CPU 1100 includes information about a moving amount of the second lens unit 22 and defocus information as well as information about a posture of the camera body 2 based on the signal from a camera posture detecting unit 1110 such as an accelerator sensor (not shown). The information further includes object distance information of an object based on the signal from a TS instructing unit 1109 for specifying a desired object on which a photographer desires to focus, defocus information, and image pickup range information for specifying a desired image pickup range (field of view). The TS instructing unit 1109 is described later in detail.

The information (signal) to be transmitted to the camera CPU 1100 from the lens CPU 1000 includes optical information such as an image pickup magnification of the lens, and lens function information such as a zooming function and an image stabilization function incorporated into the mounted lens as well as posture information from a lens posture detecting unit 1008 such as a gyro sensor and the accelerator sensor.

Each of the lens-side electric contact 1009 and the camera-side electric contact 1010 includes a contact for power supply from the camera body 2 to the lens apparatus 1.

A power switch 1101 is a switch operable by a photographer, and enables start of the camera CPU 1100, and start of power supply to the respective actuators and sensors in the image pickup apparatus. A release switch 1102 is a switch operable by the photographer, and includes a first stroke switch SW1 (not shown) and a second stroke switch SW2 (not shown). When the release switch 1102 is operated in a so-called "half-pressing" state, a signal of the first stroke switch SW1 is output, and operated in a so-called "full-pressing" state, a signal of the second stroke switch SW2 is output. The signal from the release switch 1102 is input to the camera CPU 1100. In response to an ON signal input from the first stroke switch SW1, the camera CPU 1100 is brought into an image pickup preparation state. In the image pickup preparation state, a photometry unit 1103 measures luminance of the object, and a focus detecting unit (in-focus information obtaining unit) 1104 performs a focus detecting operation.

Based on a photometry result obtained by the photometry unit 1103, the camera CPU 1100 calculates an f-number of the aperture stop mechanism 11, and an exposure value (shutter speed) of an image pickup element of the image pickup unit 1106. The camera CPU 1100 causes the focus detecting unit 1104 to detect a focused state of an image pickup optical system. Based on focus information (defocus amount and defocus direction) as the detection result, a determination is made about a driving amount of the second lens unit 22 (including the driving direction) driven by the focus unit 10 as a driving source for obtaining an in-focus condition of the object. The information about the driving amount of the lens unit (driving amount information of the second lens unit 22) is transmitted to the lens CPU 1000. The lens CPU 1000 controls operations of the respective components of the lens apparatus 1.

Further, the lens apparatus 1 according to the present invention drives the sixth lens unit 26 and the eighth lens unit 28 in the direction orthogonal to the optical axis 4 so that the tilt effect for tilting the object plane with respect to the image plane, and the shift effect for moving the image pickup range can be obtained. Thus, the camera CPU 1100 calculates the tilting amount for bringing the desired object specified by the TS instructing unit 1109 into an in-focus condition, and further calculates a shift driving amount for changing the current image pickup range to the one as specified by the TS instructing unit 1109. The information about the driving amount is transmitted from the camera CPU 1100 to the lens CPU 1000 to control driving operations of the sixth lens unit 26 and the eighth lens unit 28.

A plurality of objects can be specified by the TS instructing unit 1109. Even in the case of the objects different in distance, those objects can be focused so long as the objects are on the object plane tilted by the tilt effect (see FIG. 3B).

Further, the TS instructing unit 1109 may be incorporated into the lens apparatus 1 rather than in the camera body 2. Furthermore, the function of the TS instructing unit 1109 can be assigned the existing rotation operation unit, the button, the switch, and the like of the lens apparatus 1 or the camera body 2.

In the predetermined image pickup mode, the camera CPU 1100 starts eccentric driving of an image stabilization lens (not shown), that is, starts controlling a camera shake correction operation. As a matter of course, there is a lens apparatus into which the image stabilization function is not incorporated, and in that case, the eccentric driving control of the image stabilization lens is not required. When receiving input of the ON signal from the second stroke switch SW2, the camera CPU 1100 transmits an aperture stop driving instruction to the lens CPU 1000, and operates the aperture stop mechanism 11 to set the previously calculated f-number. The camera CPU 1100 transmits an exposure start instruction to an exposure unit 1105. Thereafter, a mirror (not shown) is retracted (as a matter of course, there is no such function for a mirrorless camera), and a shutter (not shown) is opened to cause the image pickup element of the image pickup unit 1106 to execute a photoelectric conversion of an object image formed by the lens apparatus, that is, execute an exposure operation.

An image pickup signal from the image pickup unit 1106 is digitally converted by a signal processing unit in the camera CPU 1100, and further subjected to various correction processes so that the signal is output as an image signal. An image recording unit 1107 records and stores the image signals (data) in a semiconductor memory such as a flash memory, and/or a recording medium such as a magnetic disk and an optical disc.

During picking up image, an image picked up by the image pickup unit 1106 can be displayed on the display unit 1108 as a liquid crystal display or an organic EL display. An image recorded by the image recording unit 1107 can also be displayed. In recent years, a touch operation technology has been incorporated into the display to allow selection and focusing of the object on the display for live view imaging. That is, the TS instructing unit 1109 is generally incorporated into the display unit 1108.

Next, the control flow to be executed in the lens apparatus 1 is described.

A focusing operation rotation detecting unit 1002 includes a focusing operation ring 19, and a sensor (not shown) for detecting rotations of the focusing operation ring 19. An aperture stop operation rotation detecting unit 1011 includes an aperture stop operation ring 20, and a sensor (not shown)

for detecting rotations of the aperture stop operation ring 20. A zooming operation rotation detecting unit 1003 includes the zooming operation ring 6, and a sensor (not shown) for detecting rotations of the zooming operation ring 6. A TS operation detecting unit 1001 includes the TS instructing unit 1109 for providing the tilt effect and the shift effect, a manual operating unit, and a sensor (not shown) for detecting operation amounts of those components.

An object memory unit 1012 stores a position of an object specified by the TS instructing unit 1109 and the display unit 1108 in a space in the image pickup range. This position can be defined as an object distance, and coordinates (X, Y) in an X-Y axis plane which is defined by the image pickup plane. The detailed description about the position is omitted. An IS driving unit 1004 includes a driving actuator (not shown) of the image stabilization lens for image stabilization operations, and a drive circuit for the driving actuator. As a matter of course, the lens apparatus may have no image stabilization function, and this structure is not required to be provided for such a lens apparatus.

An AF driving unit 1006 includes the second lens unit 22 as the optical system to be moved for focusing, and the focus unit (ultrasonic motor unit) 10 for moving the second lens unit 22 in the optical axis direction in accordance with the driving amount information of the second lens unit 22. The driving amount information is determined based on the signal from the camera CPU 1100. The driving amount information may be determined based on the signal derived from a manually specified focusing position by operating the focusing operation rotation detecting unit 1002.

An electromagnetic aperture stop driving unit 1005 has its driving source controlled by the lens CPU 1000 which has received an aperture stop driving command from the camera CPU 1100, and operates the aperture stop mechanism 11 to have an aperture corresponding to the specified f-number. The similar operation is performed when the photographer manually specifies the desired f-number by operating the aperture stop operation ring 20.

A TS driving unit (tilt driving unit) 1007 controls the driving source of the sixth lens unit 26 and the eighth lens unit 28 based on the lens CPU 1000 which has received the object distance, the position information, and the image pickup range information from the camera CPU 1100. Under the control, the tilt operation is performed to attain a desired plane of object to be shot (object plane) 1202b, and the shift operation is performed to obtain the desired image pickup range. It should be understood that the lens CPU 1000 controls the TS driving unit 1007 and the AF driving unit 1006 to be optimally operated in order to attain the desired in-focus condition. The lens apparatus 1 according to the present invention exhibits optical characteristics that the shift operation varies the focus even when the object distance is kept unchanged. It should also be understood that the TS driving unit 1007 and the AF driving unit 1006 are optimally controlled in accordance with the characteristics.

The gyro sensor (not shown) is fixedly disposed in the lens apparatus 1, and electrically connected to the lens CPU 1000. The gyro sensor detects each angular velocity of a vertical (pitch direction) shake, and horizontal (yaw direction) shake each as the angular shake of the image pickup apparatus 0, and outputs the detected value to the lens CPU 1000 as an angular velocity signal. The lens CPU 1000 electrically or mechanically integrates the angular velocity signal from the gyro sensor in the pitch and the yaw directions, to thereby calculate the pitch direction shake amount and the yaw direction shake amount each as the displacement in the respective directions (hereinafter collectively referred to as "angular shake amount").

Based on a composite displacement amount of the above-mentioned angular shake amount and parallel shake amount, the lens CPU 1000 controls the IS driving unit 1004 to perform shift driving of the image stabilization lens (not shown), to thereby correct both the angular shake and the parallel shake. As described above, this mechanism/function is not required for the lens apparatus having no image stabilization function. Based on a focus shake amount, the lens CPU 1000 controls the AF driving unit 1006 to drive the second lens unit 22 to the optical axis direction, to thereby correct the focus shake.

The lens CPU 1000 of the lens apparatus 1 according to the present invention controls the TS driving unit 1007 based on the vibration and displacement of the lens apparatus 1, which have been derived from the output of the gyro sensor. When hand shaking occurs during picking up image while the image pickup apparatus 0 is held in the hand, the object plane is shifted to the object. However, the image pickup apparatus 0 according to the present invention stores the object position in the object memory unit 1012, and hence the TS driving unit 1007 can be controlled to continuously align the object plane with the object while correcting the hand shaking. The detailed description is made later. In some cases, signals of the accelerator sensor incorporated into the camera body 2 may be used for controlling the TS driving unit 1007. As a matter of course, the accelerator sensor can be incorporated into the lens apparatus 1.

Figures 3A, 3B:
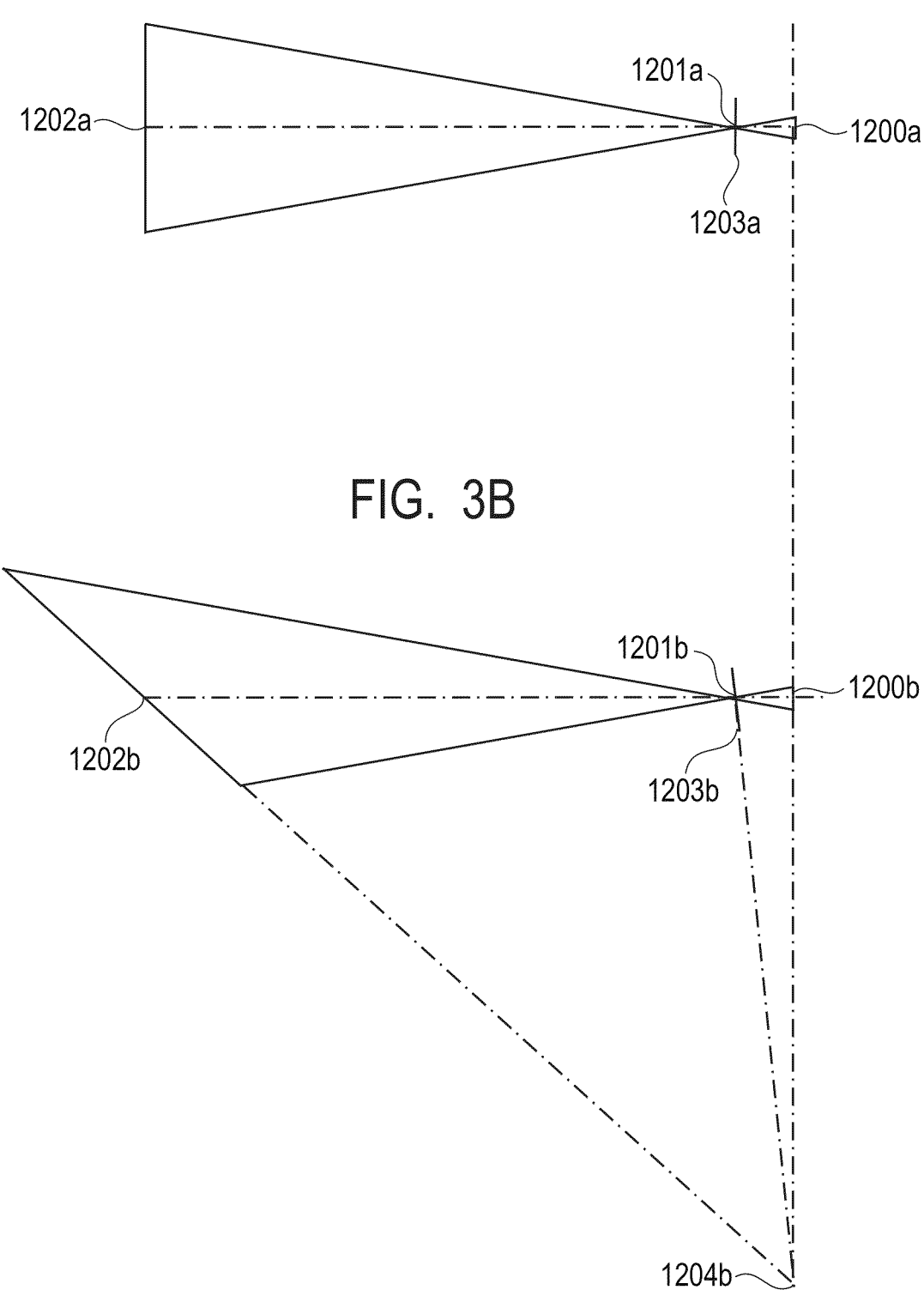
FIG. 3A is an explanatory view of a Scheimpflug principle in each embodiment.
FIG. 3B is another explanatory view of the Scheimpflug principle in each embodiment.

FIG. 3A and FIG. 3B are explanatory views of a Scheimpflug principle. When the optical axis of the optical system in the lens apparatus 1, and the image pickup element of the image pickup unit 1106 are in the tilted state, the focused range at the object side is determined by the Scheimpflug principle. FIG. 3A shows the focused range given when the optical axis of the optical system does not tilt with respect to the image plane. FIG. 3B shows the focused range given when the optical axis of the optical system tilts with respect to the image plane. FIG. 3A and FIG. 3B show image planes 1200*a* and 1200*b*, optical systems 1201*a* and 1201*b*, focused object planes 1202*a* and 1202*b*, and principal planes 1203*a* and 1203*b* of the optical system. The Scheimpflug principle is defined such that, as illustrated in FIG. 3B, when the image plane 1200*b* and the principal plane 1203*b* of the optical system intersect at an intersection point 1204*b* on a straight line, the object plane 1202*b* also passes through the intersection point 1204*b*.

When the object desired to be photographed has a depth, the object plane 1202*b* is tilted along the depth so that the object is focused from the near side to the depth side. When the depth portion is required to be focused by the lens with no tilt-shift mechanism, the method of deepening the depth of field by narrowing the aperture stop is generally implemented. However, it is possible to focus on the object adaptively to the depth by tilting even when the aperture stop of the tilt-shift lens is opened.

Tilting of the principal plane 1203*b* of the optical system 1201*b* in the direction opposite to the tilting of the object with the depth also allows intersection of the object plane 1202*b* nearly at right angles to the depth direction of the object. In this case, the focused range can be extremely narrowed, and hence a diorama-like image can be obtained.

Referring to FIGS. 4A, 4B, 4C, and 4D, the image pickup flow in this embodiment is described. FIGS. 4A, 4B, 4C, and 4D are explanatory views of a series of tilt imaging operations on the assumption that an object on a table is photographed.

Figures 4A, 4B, 4C, 4D:
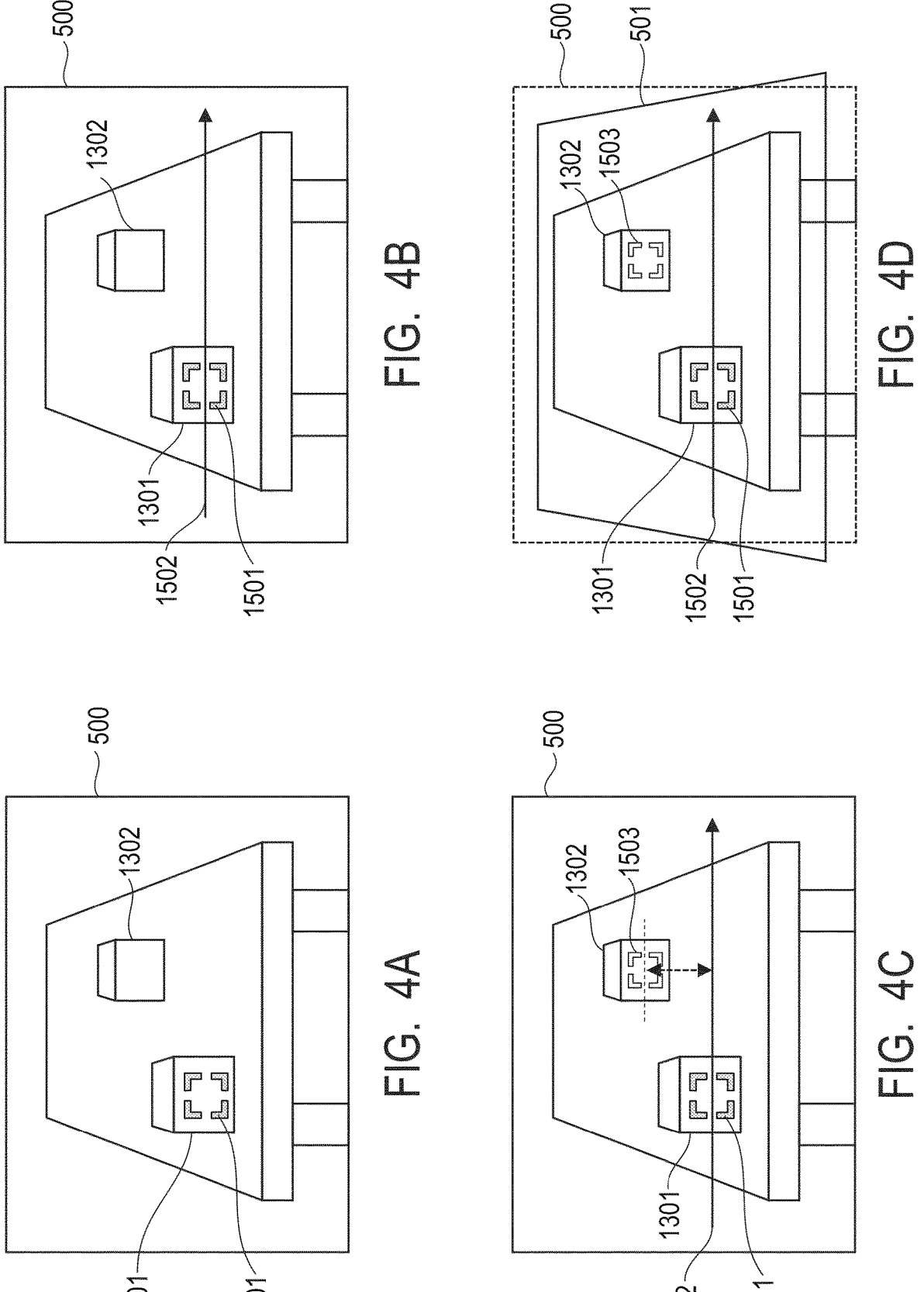
FIG. 4A is an explanatory view of a tilt imaging operation in a first embodiment.
FIG. 4B is an explanatory view of the tilt imaging operation in the first embodiment.
FIG. 4C is an explanatory view of the tilt imaging operation in the first embodiment.
FIG. 4D is an explanatory view of the tilt imaging operation in the first embodiment.

First, as illustrated in FIG. 4A, the photographer specifies an AF frame 1501 by using the camera body 2 so that a first object 1301 is focused. The camera CPU 1100 obtains the focus information (defocus amount and defocus direction) in the AF frame 1501 from the focus detecting unit 1104. Based on the focus information, the focus unit 10 is driven to bring the first object 1301 into an in-focus condition. The method of obtaining the focus information in the AF frame 1501, and the method of controlling the focus unit 10 are known, and hence detailed descriptions thereof are omitted. The timing for bringing the first object 1301 into the in-focus condition may be the timing for specifying an inclination of an object plane 500 besides the timing for selecting the AF frame 1501 by the photographer.

Subsequently, as illustrated in FIG. 4B, the photographer specifies the direction of an axis 1502 of object plane rotation as the rotation center for tilting the object plane 500. The axis 1502 of object plane rotation is a straight line passing through the center of the AF frame 1501, and can be set in an angular range of 180 degrees with respect to the AF frame 1501 as the center. In this embodiment, it is assumed that the photographer specifies an angle intuitively by using the rotation operating unit, buttons, switches, and the like of the camera body 2 or the lens apparatus 1. However, the angle can be specified based on a numerical value. The image pickup mode for setting the axis 1502 of object plane rotation to an appropriate angle by the camera CPU 1100 adaptively to the object to be photographed may be provided.

Subsequently, as illustrated in FIG. 4C, an auxiliary frame 1503 is set at a position (a position of an object which is not disposed on the rotation axis) separating from the axis 1502 of object plane rotation which has been set as illustrated in FIG. 4B in the orthogonal direction. In this case, the camera CPU 1100 obtains the focus information (defocus amount and defocus direction) in the auxiliary frame 1503 from the focus detecting unit 1104. The auxiliary frame 1503 may be set automatically by utilizing the object detecting technology besides the method which allows the photographer to select the object such as a second object 1302.

Before completion of setting the AF frame 1501 and the auxiliary frame 1503, and the operation for obtaining the focus information about the respective frames described above, the aperture stop mechanism 11 sets an aperture to a predetermined f-number to be held. That is, the predetermined f-number is held in a non-open state. In this embodiment, the tilt image pickup mode is set. When the mode is selected, the aperture is stopped down to the initial f-number which is set for each lens. The initial f-number is set to the f-number obtained when the resolving power reaches a peak position, which differs in accordance with lens characteristics. Generally, the f-number which reaches the peak of the resolving power is at a point at which the aperture has been narrowed to a certain degree from the open state. In the case of the lens having the peak near an open f-number, it is possible to set the value narrowed from the open f-number by approximately two steps. High resolution to the smallest detail is essential for taking the landscape photograph utilizing the tilt lens, or a photograph utilizing the diorama effect, and hence optimization of the initial f-number for each lens reduces the opportunity for the photographer to set the f-number with hesitation over the setting. The f-number can be changed from the initial value as a matter of course. In this case, the aperture stop mechanism 11 changes the aperture to the specified f-number to be held.

Subsequently, as illustrated in FIG. 4D, the object plane 500 is tilted about the axis 1502 of object plane rotation set as illustrated in FIG. 4B as the center. In this embodiment, it is assumed that the inclination of the object plane 500 can be changed intuitively by using the TS instructing unit 1109 allocated to the rotation operating unit, the button, and the switch of the camera body 2 or the lens apparatus 1. The object plane may be tilted at the angle specified as the numerical value. The photographer adjusts the inclination of the object plane 500 while confirming the in-focus degree and bokeh in the image pickup range. When a desired object plane 501 is attained, the shutter is pressed to complete imaging.

Figure 5A:
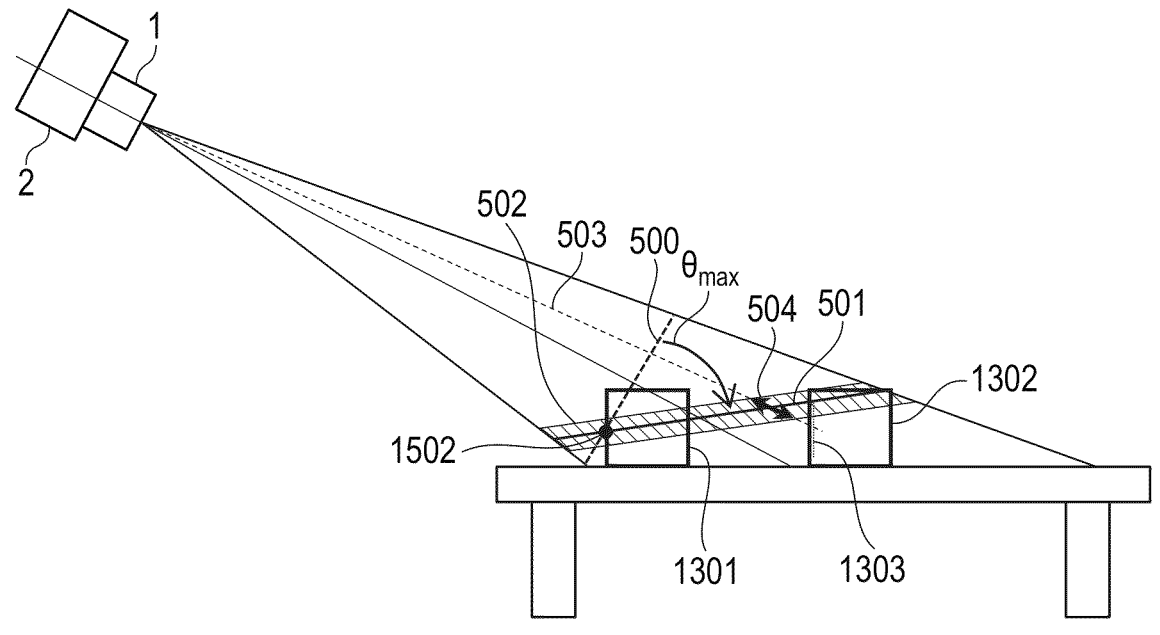
FIG. 5A is an explanatory view of an in-focus range during the tilt imaging operation in the first embodiment.
Figure 5B:
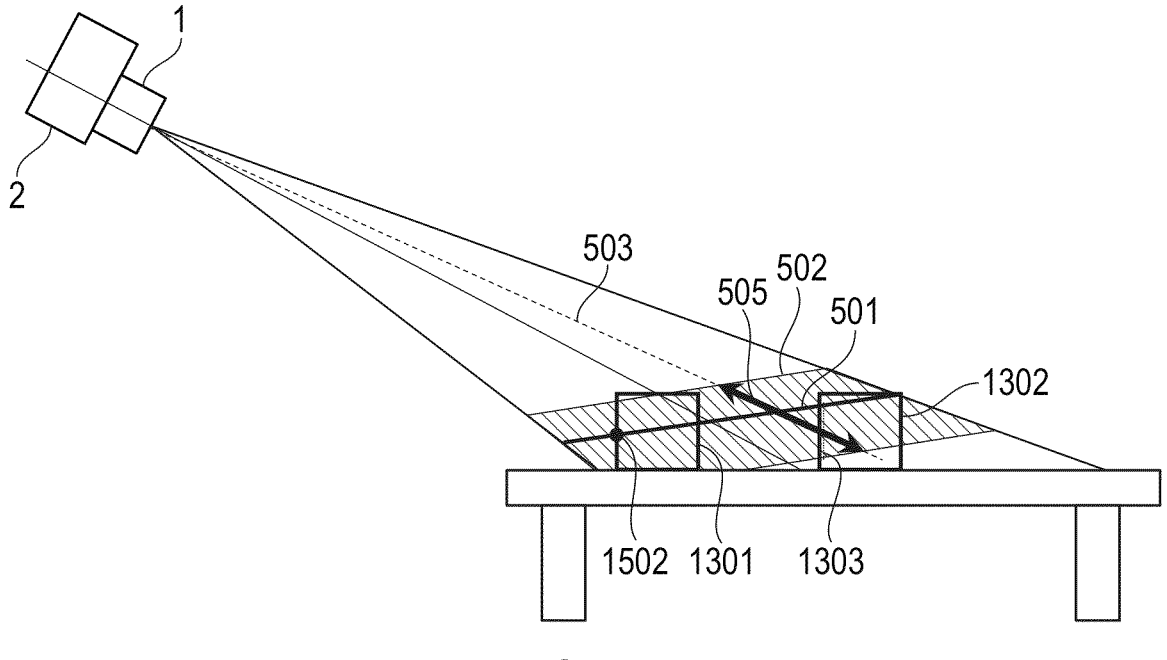
FIG. 5B is another explanatory view of the in-focus range during the tilt imaging operation in the first embodiment.

Referring to FIGS. 5A and 5B, an aperture stop control method in this embodiment is described next. FIGS. 5A and 5B are sectional views vertical to the axis 1502 of object plane rotation for imaging as illustrated in FIGS. 4A, 4B, 4C, and 4D.

FIG. 5A shows that the object plane 501 formed by tilting the object plane 500 clockwise about the axis 1502 of object plane rotation set on the first object 1301 as the center up to the largest angle $\theta_{max}$ that can be set by the lens apparatus 1. The auxiliary frame 1503 is set on the second object 1302 as illustrated in FIG. 4C. While the object plane 500 is tilted with respect to the object plane 501, the camera CPU 1100 obtains the focus information in the auxiliary frame 1503. With reference to the change in the focus information, the camera CPU 1100 determines as to which direction the photographer tilts the object plane 500 in the in-focus direction or in the out-of-focus direction on the second object 1302. In this embodiment, it is assumed that the focus information is derived from the detection result obtained by implementing the phase-difference method. The focus information may be derived from the detection result obtained by implementing the contrast method.

A hatched section represents a depth of field 502 with respect to the front and rear of the object plane 501 in the case of the predetermined f-number. A broken line 503 of FIGS. 5A and 5B represents the line as a view of the center position of the auxiliary frame 1503 seen from the camera. A two-way arrow mark 504 represents an in-focus range including the depth of field to the front and rear of the object plane at the center position (on the broken line 503) of the auxiliary frame 1503. Assuming that a plane (left side in FIGS. 5A and 5B) having the axis 1502 of object plane rotation set for the first object 1301 is defined as a front surface of the object, most part of a dotted line 1303 (FIG. 5A) corresponding to the auxiliary frame 1503 of the front surface of the second object 1302 deviates from the depth of field 502. When the second object 1302 is desired to be brought into the in-focus condition, the photographer instructs to further tilt the object plane by operating the rotation operating unit, the button, the switch, and the like.

However, the object plane cannot be tilted over the object plane 501. The camera CPU 1100 then determines whether it is possible to obtain the same in-focus range as the one derived from tilting the object plane tilted by changing the f-number. When it is determined that the in-focus range can be obtained by changing the f-number, the lens CPU 1000 controls the aperture stop mechanism 11 to narrow the aperture so that the depth of field 502 is deepened as indicated by a two-way arrow mark 505 of FIG. 5B.

The determination as described above is made based on the in-focus distance information, the f-number, and in-focus information (first in-focus information) about the auxiliary frame 1503. The lens CPU 1000 determines whether the tilting of the focus plane as specified by the photographer is within a settable range. When the tilting exceeds the settable range, the information is transmitted to the camera CPU 1100. When receiving the information, the camera CPU 1100 calculates an in-focus degree of the auxiliary frame 1503 as a predicted value obtained when the object plane is set as desired by the photographer based on such information as the in-focus distance information and the f-number. The calculated in-focus degree is compared with the in-focus degree of the auxiliary frame 1503 in the object plane 501 tilted to the limit of the settable range. It is then determined whether the same in-focus degree can be obtained by adjusting the depth of field 502. Based on the determination result, the lens CPU 1000 calculates the tilting amount and the aperture stop driving amount to drive the respective actuators.

The first object 1301 and the second object 1302 can thus be brought into the in-focus condition. The photographer is allowed to perform the tilt imaging only by intuitive operations because the CPU determines as to change in the f-number, and selection of the f-number to set. This allows the photographer to concentrate on formation of the image which matches the photographer's intention.

Referring to FIGS. 5A and 5B, descriptions have been made with respect to focusing on both the first object 1301 and the second object 1302 as an example. When it is specified to tilt the object plane to the direction for bringing the second object 1302 into the out-of-focus condition, the aperture stop is controlled to open the aperture to decrease the depth of field 502.

Change in the aperture of the aperture stop mechanism 11 varies the amount of light entering the image pickup unit 1106. The shutter speed and the ISO sensitivity are then adjusted so that brightness of an image before and after changing the f-number is kept unchanged. When the amount of light entering the image pickup unit 1106 is reduced by decreasing the aperture of the aperture stop mechanism 11, for example, the ISO sensitivity is increased to compensate the light amount so that the shutter speed does not become too slow. Adjustment of the shutter speed and the sensitivity allows image pickup conditions to be held in a satisfactory state.

Figure 6:
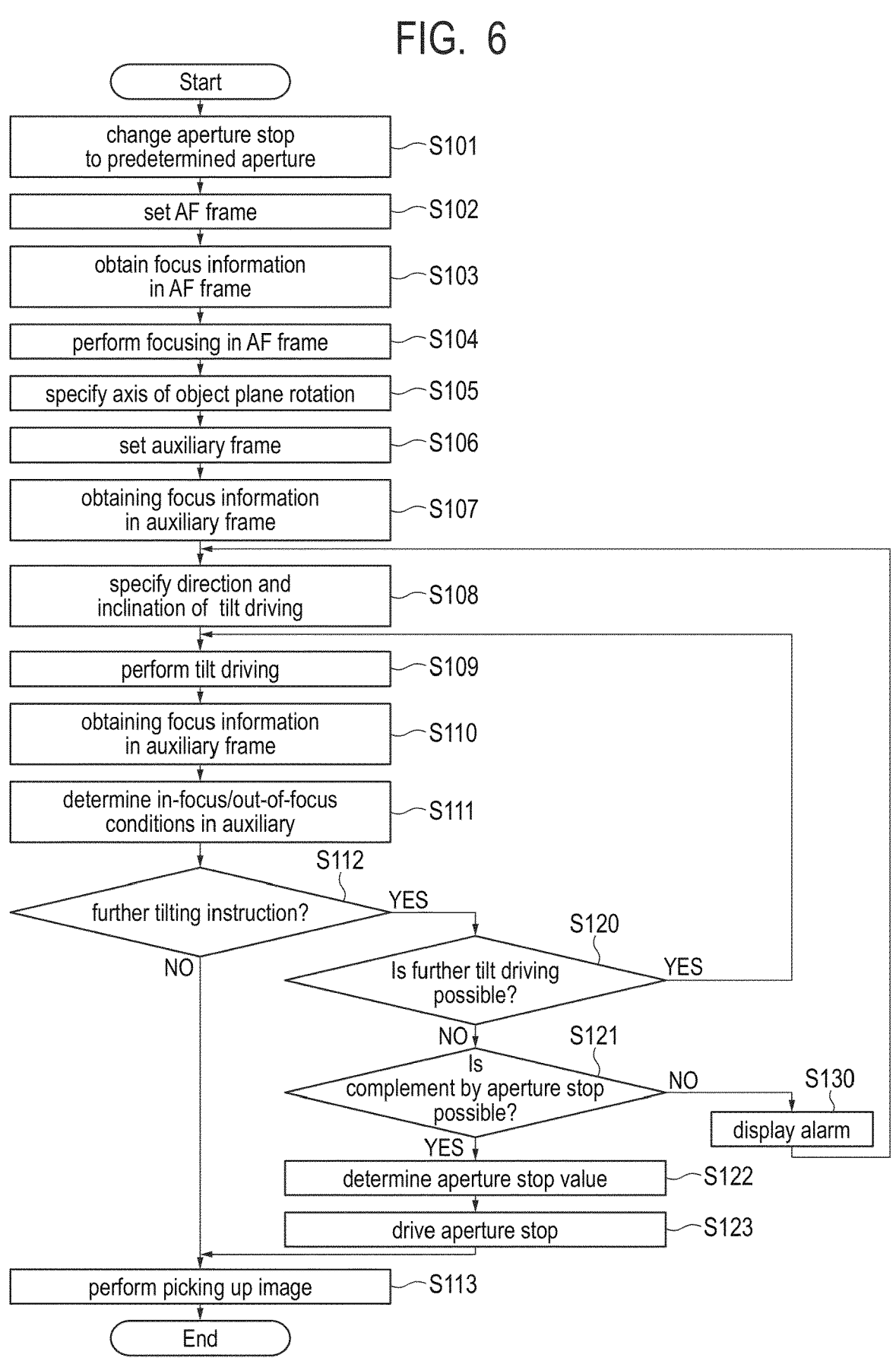
FIG. 6 is a flowchart for illustrating the tilt imaging operation in the first embodiment.

A series of the tilt imaging operations have been described. Next, referring to FIG. 6, the method of controlling the tilt imaging in this embodiment is described in detail. FIG. 6 is a flowchart for illustrating the tilt imaging operation. Each step as illustrated in FIG. 6 may be executed by any of the camera CPU 1100 and the lens CPU 1000. Alternatively, execution of the respective steps may be shared by the camera CPU 1100 and the lens CPU 1000. That is, the respective steps as illustrated in FIG. 6 are executed by at least one of the camera CPU 1100 or the lens CPU 1000, or executed based on the instruction from at least one of the camera CPU 1100 or the lens CPU 1000. It is also possible that a control apparatus physically separated from the camera CPU 1100 or the lens CPU 1000 executes at least some of the steps.

First, in Step S101, the aperture stop mechanism 11 is operated to set the predetermined aperture amount. Subsequently, in Step S102, the photographer specifies the AF frame 1501. Subsequently, in Step S103, the camera CPU 1100 causes the focus detecting unit 1104 to obtain the focus information (defocus amount and defocus direction) in the AF frame 1501. In Step S104, based on the focus information, the lens CPU 1000 drives the focus unit 10 to bring the AF frame 1501 into the in-focus condition. Subsequently, in Step S105, the direction of the axis 1502 of object plane rotation is specified.

Subsequently, in Step S106, the photographer or the camera CPU 1100 sets the auxiliary frame 1503. In Step S107, the focus information in the auxiliary frame 1503 which has been set in Step S106 is obtained. The obtained focus information is stored in the camera CPU 1100.

Subsequently, in Step S108, the photographer uses the TS instructing unit 1109 to specify a tilting direction and an inclination of the object plane. In Step S109, following the tilting direction and the inclination of the object plane as specified in Step S108, the lens CPU 1000 controls the TS driving unit 1007 to move the sixth lens unit 26 and the eighth lens unit 28 for tilt driving. Subsequently, in Step S110, the focus information in the auxiliary frame 1503 is obtained. Subsequently, in Step S111, the camera CPU 1100 compares the focus information obtained in Step S107 with the one obtained in Step S110 to determine as to which direction of the in-focus direction and the out-of-focus direction the object plane is tilted with respect to the auxiliary frame 1503.

Subsequently, in Step S112, it is determined whether or not there is an additional tilt driving instruction (drive information) from the TS instructing unit 1109. When it is determined that there is no additional driving instruction, the process proceeds to Step S113, in which the photographer presses the shutter to complete picking up an image. In Step S112, existence of the additional driving instruction from the TS instructing unit 1109 indicates that the photographer has been continuing the tilting operation to the in-focus direction or the out-of-focus direction with respect to the auxiliary frame 1503 as determined in Step S111. When it is determined that there is an additional driving instruction, the process proceeds to Step S120.

In Step S120, it is determined whether the object plane can be tilted by driving the sixth lens unit 26 and the eighth lens unit 28 following the additional instruction. When it is determined that the object plane can be tilted, the process returns to Step S109, in which the TS driving unit 1007 is controlled to drive the sixth lens unit 26 and the eighth lens unit 28. When the control operations are performed repeatedly, the desired object plane can be formed by following the continuous instruction of the photographer.

In Step S120, when it is determined that further tilt driving is impossible (for example, the object plane is at the tilt drive terminal end (drive information)), the process proceeds to Step S121. In Step S121, the camera CPU 1100 calculates the in-focus degree in the auxiliary frame 1503 given when the object plane is tilted up to the one as specified in Step S112. It is then determined whether or not the in-focus degree (in-focus condition) is attainable by adjusting the aperture of the aperture stop mechanism 11. When it is determined that it is impossible to attain the in-focus degree, the process proceeds to Step S130 to display an alarm. The process then returns to the stage before Step S108 for specifying the tilt driving direction and the inclination.

When it is determined that the in-focus condition is attainable in Step S121, the process proceeds to Step S122. In Step S122, the camera CPU 1100 determines the f-number, and transmits the value to the lens CPU 1000. Subsequently, in Step S123, the lens CPU 1000 drives the aperture stop mechanism 11 to change the aperture amount of the aperture stop mechanism 11 to the first aperture amount for bringing the object in the auxiliary frame 1503 into the in-focus condition. Then in Step S113, the photographer presses the shutter to complete imaging.

The calculation in Step S121 is executed based on at least one of properties including a position of the axis of object plane rotation in the image pickup display, the tilt angle, the in-focus range at the object distance in the auxiliary frame

1503 (state of the optical system, and opening degree of aperture), and the desired in-focus degree with respect to the object. The calculation may be executed based on a correlation among at least several of those parameters, or may be read from a preliminarily formed table showing the correlation among those parameters.

Assuming that the tilt driving cannot be performed in spite of the tilt instruction during tilt driving to bring the auxiliary frame 1503 to the out-of-focus direction, when such failure can be complemented by adjusting the aperture stop (YES in Step S121), the aperture stop can be varied to the open side by a predetermined number of steps for each recognition of the tilt instruction. For example, the aperture stop can be changed to the open side by 1 or 0.5 step for each recognition of the tilt instruction.

That is, in the processing steps of Step S112 and Step S120 to Step S123, when the TS driving unit 1007 drives the sixth lens unit 26 and the eighth lens unit 28 to reach the terminal end, and lenses are stopped, the aperture stop mechanism 11 is controlled based on the change in the in-focus degree of the object in the auxiliary frame 1503 during driving. More specifically, when the in-focus degree of the object in the auxiliary frame 1503 during driving has increased, the aperture stop mechanism 11 is controlled to decrease the aperture amount. When the in-focus degree of the object in the auxiliary frame 1503 during driving has decreased, the aperture stop mechanism 11 is controlled to increase the aperture amount.

When the aperture stop is driven after the f-number is determined in Step S122, the control operation for changing the shutter speed (exposure time) and the ISO sensitivity of the camera body 2 may be performed as required.

Even in the case in which the tilt driving cannot be performed up to the position as specified in Step S112 in the process illustrated in FIG. 6, when the intended in-focus degree of the auxiliary frame 1503 can be attained by adjusting the aperture stop, the image with the desired in-focus degree can be obtained by the tilt driving and the seamless driving of the aperture stop.

Second Embodiment

Figure 7:
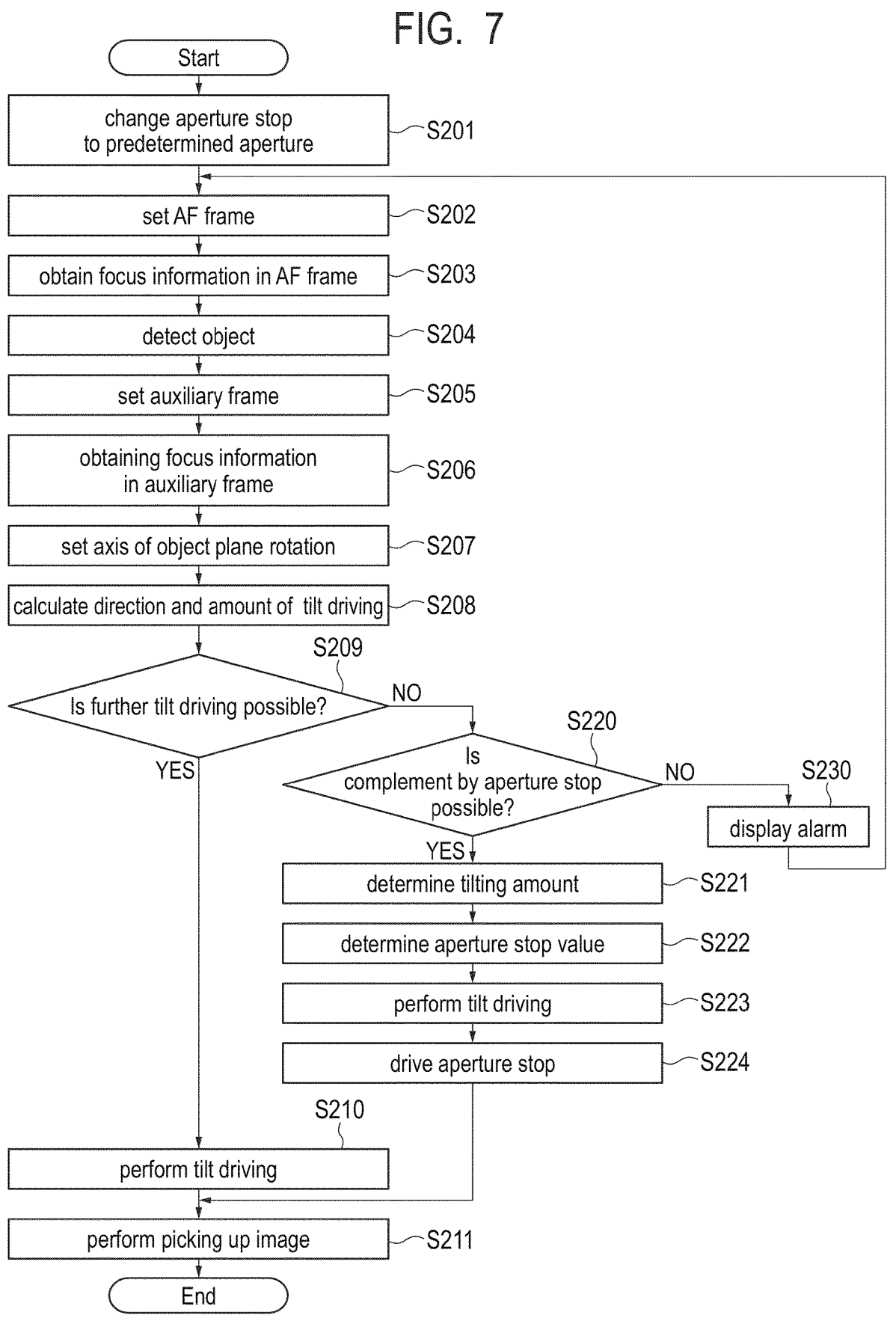
FIG. 7 is a flowchart for illustrating a tilt imaging operation in a second embodiment.

In the first embodiment, the flow of picking up image performed by the photographer while adjusting the angle of the object plane has been described. In a second embodiment, referring to FIG. 7, a flow of picking up image performed by automatically adjusting the angle of the object plane and the aperture stop is described.

First, in Step S201, the aperture stop mechanism 11 changes the aperture stop to a predetermined aperture. Subsequently, in Step S202, the photographer sets the AF frame 1501. Subsequently, in Step S203, the camera CPU 1100 causes the focus detecting unit 1104 to obtain the in-focus information (defocus amount) (second in-focus information) in the AF frame 1501, and stores the focus information, and coordinate information of the AF frame 1501 in the image pickup range. Subsequently, in Step S204, the range (size and area) of the object existing in the AF frame 1501, and a type of the object are detected.

Subsequently, in Step S205, the photographer sets the auxiliary frame 1503. In Step S206, the focus information in the auxiliary frame 1503 which has been set in Step S205 is obtained. The obtained focus information is stored in the camera CPU 1100.

Based on information obtained in Step S204 and Step S205, the camera CPU 1100 sets the axis 1502 of object plane rotation in Step S207. Subsequently, in Step S208, the camera CPU 1100 calculates the tilt driving direction and the driving amount to allow both the AF frame 1501 and the auxiliary frame 1503 to be brought into the in-focus conditions.

The tilt driving direction calculated in Step S208, that is, the position of the axis 1502 of object plane rotation (rotation axis of tilt) may be set as described below besides the exemplified process for setting the axis in the horizontal direction as drawn in FIGS. 4A, 4B, 4C, and 4D. Based on the object range (size and area), and the object type as detected in Step S204, the longitudinal direction of the objects is determined and obtained. The axis 1502 of object plane rotation may be set along the obtained longitudinal direction. Alternatively, an axis passing through the center of the AF frame 1501, which is vertical to the line for connecting the center of the AF frame 1501 and the center of the auxiliary frame 1503 and is also vertical to the optical axis may be defined as the axis 1502 of object plane rotation. Setting of the axis of object plane rotation as described above allows the auxiliary frame 1503 to be brought into the in-focus condition by a minimum tilting amount (rotation amount). The axis 1502 of object plane rotation may be given by the photographer, or the axis 1502 of object plane rotation may be set in a predetermined range. The method of setting the axis 1502 of object plane rotation is not limited to the methods as described above.

Next, in Step S209, the lens CPU 1000 determines whether or not the driving amount calculated in Step S208 is in the range in which the sixth lens unit 26 and the eighth lens unit 28 can be driven.

In Step S209, when it is determined that the tilt driving is attainable, the process proceeds to Step S210. In Step S210, the lens CPU 1000 controls the TS driving unit 1007 to drive the sixth lens unit 26 and the eighth lens unit 28. The process then proceeds to Step S211, in which the photographer fully presses the shutter to pick up an image, and completes picking up image.

In Step S209, when it is determined that the tilt driving is not attainable, the process proceeds to Step S220. In Step S220, the camera CPU 1100 determines whether or not the auxiliary frame 1503 can be brought into the in-focus condition by deriving the range in which the in-focus condition is attainable when the object plane is tilted up to the limit of the drivable range, adjusting the aperture of the aperture stop mechanism 11, and increasing the depth of field 502. When it is determined that the in-focus condition is not attainable, the process proceeds to Step S230 to display an alarm. The process then returns to Step S202.

When it is determined that the in-focus condition is attainable in Step S220, the tilting amount (second tilting amount) is determined in Step S221. Subsequently, in Step S222, the f-number (second aperture amount) is determined based on the result obtained in Step S220. Subsequently, in Step S223, the lens CPU 1000 controls the TS driving unit 1007 to drive the sixth lens unit 26 and the eighth lens unit 28 so that the second tilting amount is set. Subsequently, in Step S224, the lens CPU 1000 drives the aperture stop mechanism 11 to change the aperture so that the second aperture amount is set. The process then proceeds to Step S211, in which the photographer presses the shutter to complete picking up image.

When the f-number is determined in Step S222 to drive the aperture stop, the control for changing the shutter speed (exposure time) and the ISO sensitivity of the camera body 2 may be executed as required.

The calculation in Step S220 is executed based on at least one of properties including positions of the AF frame 1501 and the auxiliary frame 1503 in the image pickup display, each object distance (defocus information) in the AF frame 1501 and in the auxiliary frame 1503, a correlation between the tilting angle and the in-focus range of the position of the auxiliary frame 1503 (object plane position and depth of field), and a correlation between the optical system state including the opening degree of aperture, and the depth of field 502. The calculation may be executed based on a correlation among at least several of those parameters, or may be read from a preliminarily formed table showing the correlation among several of those parameters.

Even in the case in which the lens cannot be moved to the position specified for tilting in Step S112 in the process illustrated in FIG. 6, when the intended in-focus degree of the auxiliary frame 1503 can be attained by adjusting the aperture stop, the image with the desired in-focus degree can be obtained by the seamless driving of the tilt driving and the aperture stop.

The embodiments have been described as having the configuration in which the sixth lens unit 26 and the eighth lens unit 28 are moved in the direction orthogonal to the optical axis 4 to obtain the tilt effect for tilting the object plane with respect to the image plane, and the shift effect for moving the image pickup range to the direction vertical to the optical axis. However, the present invention is not limited to the embodiments described above, but may be configured freely so long as the tilt effect can be obtained by displacement of at least some of the plurality of lenses of the lens apparatus. Movement of at least some of lenses in the direction vertical to the optical axis 4, rotative movement of the lens about the axis vertical to the optical axis 4 while intersecting therewith, or both thereof may be considered as the displacement of at least some of lenses.

In the exemplified embodiments, the image pickup apparatus 0 has been described. The main control as described with reference to FIG. 6 and FIG. 7 may be executed by the lens CPU 1000 (control unit) of the lens apparatus 1 by obtaining the required in-focus information from the camera body 2. In this case, the lens apparatus 1 may include an in-focus information obtaining unit for obtaining the in-focus information about the AF frame 1501 and the auxiliary frame 1503 from the focus detecting unit 1104 of the camera body 2.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-062509, filed Apr. 7, 2023, which is hereby incorporated by reference herein in its entirety.

What is claimed is:

1. A lens apparatus connectable to a camera body, the lens apparatus comprising:

an optical system including a plurality of lenses;

a tilting unit configured to change an angle of an object plane to an optical axis about an axis of rotation by displacing at least one of the plurality of lenses;

an aperture stop configured to change an aperture diameter;

an aperture stop driving unit configured to drive the aperture stop to change the aperture diameter;

an obtaining unit configured to obtain, from the camera body, a first in-focus information of a first object which is displaced from the axis of rotation; and a control unit configured to control the aperture stop driving unit according to a change in an in-focus degree of the first object based on the first in-focus information and during driving of the tilting unit when the tilting unit is driven to reach a terminal end.

2. The lens apparatus according to claim 1, wherein, when the in-focus degree of the first object during the driving of the tilting unit is increased, the control unit is configured to control the aperture stop driving unit so as to decrease the aperture diameter of the aperture stop.

3. The lens apparatus according to claim 1, wherein, when the in-focus degree of the first object during the driving of the tilting unit is increased, the control unit is configured to obtain a first aperture diameter of the aperture stop for bringing the first object into an in-focus range, and controls the aperture stop driving unit so as to cause the aperture stop to attain the first aperture diameter.

4. The lens apparatus according to claim 3, wherein the control unit is configured to output an alarm when the in-focus degree of the first object during the driving of the tilting unit has been increased, and the first object is not allowed to be brought into the in-focus range by stopping down the aperture stop.

5. The lens apparatus according to claim 1, wherein, when the in-focus degree of the first object during the driving of the tilting unit is decreased, the control unit is configured to control the aperture stop driving unit so as to increase the aperture diameter of the aperture stop.

6. The lens apparatus according to claim 1, wherein the plurality of lenses includes a focus lens configured to be moved for focusing, and wherein the lens apparatus further comprises a focus control unit configured to control driving of the focus lens so as to bring a second object on the axis of rotation into an in-focus condition.

7. The lens apparatus according to claim 1, further comprising a tilt driving unit configured to drive the tilting unit, wherein the obtaining unit is configured to obtain a second in-focus information of a second object existing on the axis of rotation, and wherein the control unit is configured to obtain, based on the first in-focus information and the second in-focus information, a second tilting amount and a second aperture diameter of the aperture stop for bringing the first object and the second object into in-focus conditions, control the tilt driving unit so as to attain the second tilting amount, and control the aperture stop driving unit so as to cause the aperture stop to attain the second aperture diameter.

8. The lens apparatus according to claim 7, wherein the control unit is configured to control the tilt driving unit by setting the axis of rotation and a tilting amount so as to cause the first object to be in the object plane.

9. The lens apparatus according to claim 7, wherein the control unit is configured to set an axis of rotation and a tilting amount at which the first object is nearest to an object plane and to control the aperture stop driving unit so as to bring the first object into an in-focus range at the axis of rotation and the tilting amount.

10. The lens apparatus according to claim 7, wherein the second in-focus information is obtained under a state in which the aperture diameter is a predetermined value other than a maximum value.

11. The lens apparatus according to claim 7, wherein the control unit is configured to output an alarm when it is not possible to obtain, based on the first in-focus information and the second in-focus information, a tilting amount and an aperture diameter of the aperture stop for bringing the first object and the second object into the in-focus conditions.

12. The lens apparatus according to claim 1, wherein the first in-focus information is obtained under a state in which the aperture diameter is a predetermined value other than a maximum value.

13. An image pickup apparatus comprising:

a lens apparatus according to claim 1; and a camera apparatus including an image pickup element configured to pick up an image formed by the lens apparatus.

14. The image pickup apparatus according to claim 13, wherein the camera apparatus includes a camera controlling unit configured to control at least one of a shutter speed or an ISO sensitivity based on a change in an aperture diameter of the aperture stop.

* * * * *